United States Patent [19]

Scott

[11] Patent Number: 5,287,782
[45] Date of Patent: Feb. 22, 1994

[54] GANG SAW WITH HORIZONTALLY AND VERTICALLY MOVABLE HOLD-DOWNS

[75] Inventor: Mark A. Scott, Bend, Oreg.

[73] Assignee: PIW Industries Inc., Portland, Oreg.

[21] Appl. No.: 947,390

[22] Filed: Sep. 21, 1992

[51] Int. Cl.⁵ .............................................. B26D 7/01
[52] U.S. Cl. ...................................... 83/447; 83/422; 83/425.3; 83/450
[58] Field of Search ............... 83/447, 450, 422, 425.3, 83/425.4; 144/374

[56] References Cited

U.S. PATENT DOCUMENTS

| | | | |
|---|---|---|---|
| 1,089,223 | 3/1914 | Jenkins | 83/450 X |
| 2,842,169 | 7/1958 | Joa | 83/422 |
| 3,202,189 | 8/1965 | Pearson | 83/508.3 |
| 3,866,502 | 2/1975 | Brewer, Sr. | 83/447 X |
| 3,990,568 | 11/1976 | Wilson, Sr. | 83/422 X |
| 4,181,056 | 1/1980 | Zimmerman | 83/422 X |
| 4,414,875 | 11/1983 | Pearson | 83/508.3 |
| 5,203,246 | 4/1993 | Smitterberg et al. | 83/447 X |

*Primary Examiner*—Richard K. Seidel
*Assistant Examiner*—Kenneth E. Peterson
*Attorney, Agent, or Firm*—Kolisch, Hartwell, Dickinson, McCormack & Heuser

[57] ABSTRACT

A rip saw with multiple saws adjustably positionable along a power-driven arbor. A clamp or hold-down assembly is provided on its upstream side, and on the downstream side, of the arbor and its saws. Each assembly is passable along an inclined path that converges on the path of travel of work through the machine. The assemblies inhibit fluttering in and otherwise stabilize boards as they are being cut by the saws.

8 Claims, 2 Drawing Sheets

GANG SAW WITH HORIZONTALLY AND VERTICALLY MOVABLE HOLD-DOWNS

BACKGROUND AND SUMMARY OF THE INVENTION

This invention relates to saw apparatus, and more particularly, to saw apparatus which is known in the industry as a gang or rip saw, and which normally includes plural circular saws adjustably mounted on a power-driven saw arbor so as to be relatively shiftable laterally of each other to change the width of boards cut by the machine.

Saw apparatus of this description is illustrated in prior U.S. Pat. Nos. 4,414,875 and 3,202,189. In these patents, and as typifies the usual rip saw, plural saws are disposed side-by-side on a power-driven saw arbor, with the saws keyed to the arbor so that rotation of the arbor produces rotation of the saws. Saw shifters are provided which are actuated to shift the position of respective saws along the saw arbor. Ordinarily, the arbor extends horizontally in the saw apparatus, and a suitable conveyor system transports lumber or work-pieces in a direction extending transversely of the saw arbor and in a path which extends adjacent the peripheries of the various saws.

In saw apparatus of the above description, difficulties have been experienced in properly supporting and holding down the lumber as it moves in the vicinity of the saws and while being cut. This is particularly true in connection with the holding down and supporting of the end of a piece of lumber during its cutting. Further explaining, a board on traveling through a saw normally is held down in regions on opposite sides of where the cut is being made. As the trailing end of the board travels into a position to be cut, the board moves into a position where it is held down on the downstream side of the saw arbor only, and the extreme upstream end of the board has moved free of any hold-down means. When this occurs, the action of the saw causes the board to flutter, resulting in tear-out of wood material where the cut is being made and the production of a ragged cut. Obviously this is detrimental in equipment designed to produce precision cutting with minimum wastage of wood.

The problem of proper holding down boards as they are being cut is complicated by several factors, which include the fact that saw apparatus normally must handle material of various thicknesses, and with thinner material any flutter in a board end becomes more pronounced. Further, any gang saw mechanism includes some system for adjustably positioning the respective saws, so that any hold-down system provided must not interfere with movement of the saws or operation of the shifter mechanism producing their movement.

Generally, an object of the invention is to provide saw apparatus, such as a rip saw, which includes one or more saws shiftable along an arbor, with improved means for clamping or holding down work-pieces during their cutting.

Another object is to provide such saw mechanism where the hold-down or clamp means is adjustable, to take care of variations in thickness in the work-pieces handled.

Yet another further object is to provide a novel clamp or hold-down means in a gang or rip saw which includes shoe structure extending parallel to the arbor on one side where the cutting is performed, and a novel mounting for the shoe structure whereby it provides the support desired for thick and thin pieces.

In a preferred embodiment of the invention, the shoe structure and a hold-down roll are both part of a moveable assembly located on the feed side where cutting occurs. The shoe structure and hold-down roll move along an inclined path down and toward support for work-pieces, thus properly engaging work-pieces of various thickness. The structure guiding the shoe and hold-down roll is relatively compact and out of the way of the working region of the machine.

These and other objects and advantages are attained by the invention, which is described hereinbelow in conjunction with the accompanying drawings, wherein.

Figure 1:
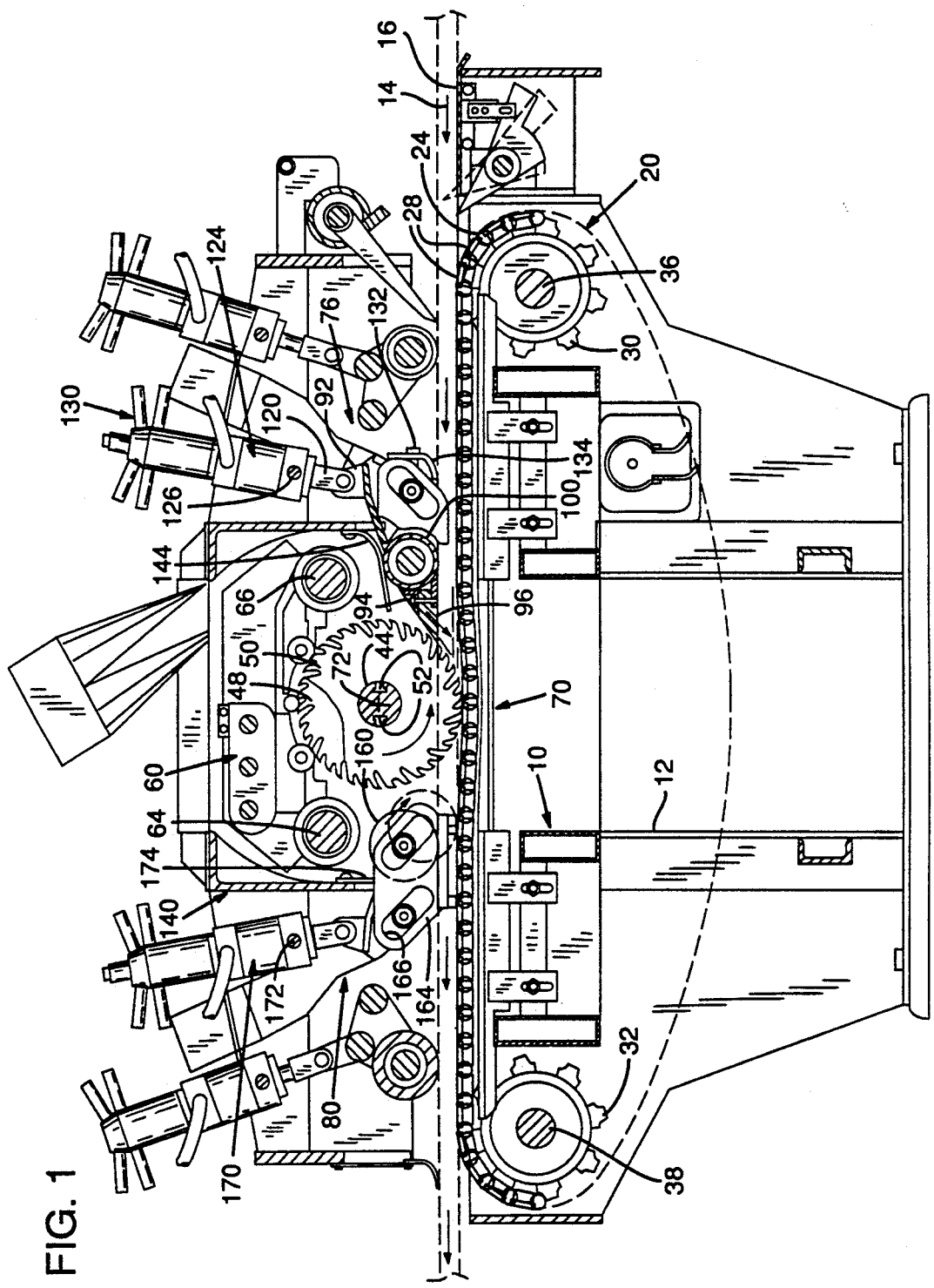
FIG. 1 is a cross-section side elevation view of a rip saw construction as contemplated.
Figure 2:
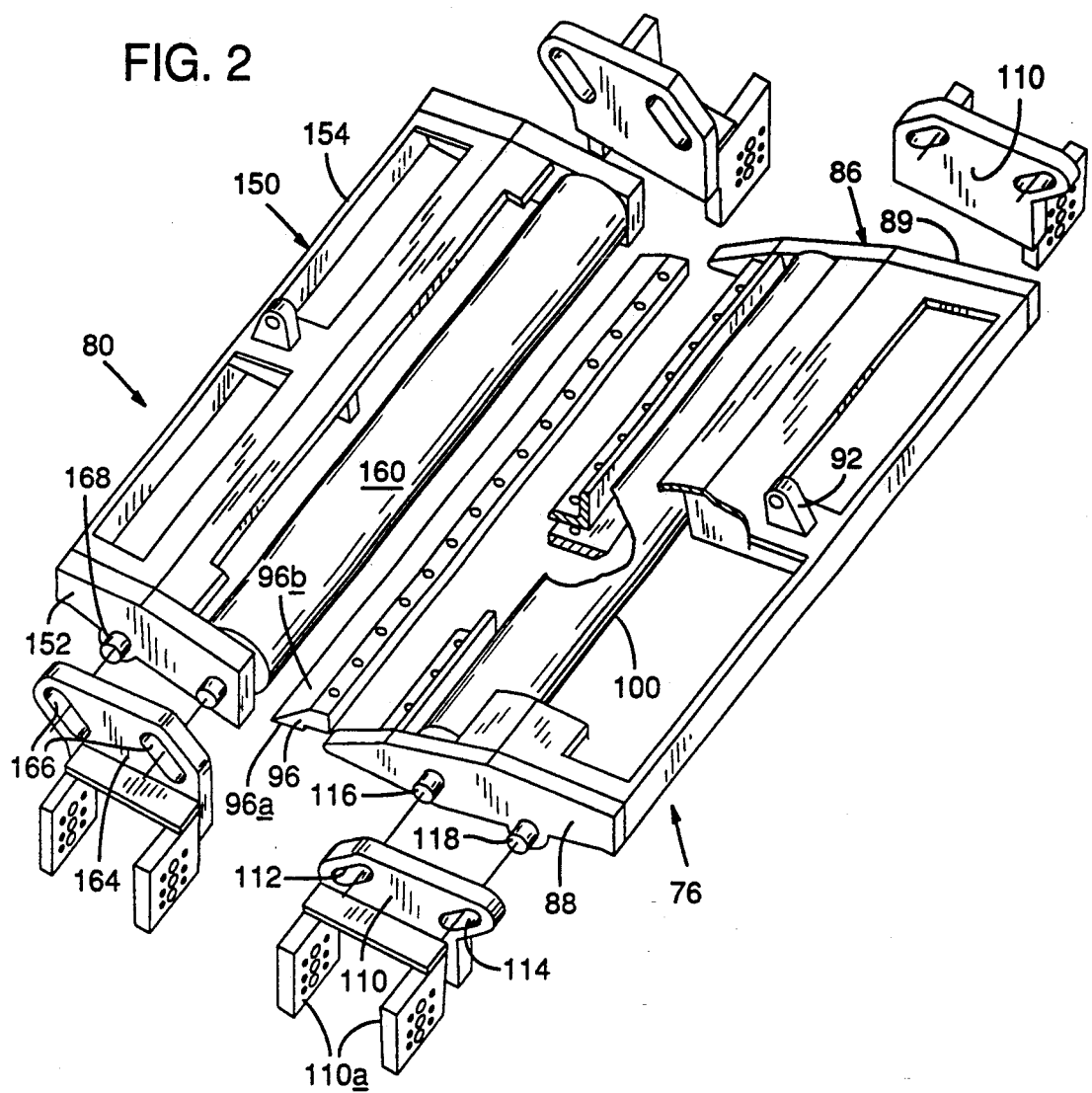
FIG. 2 is a perspective exploded view of clamp structures in the rip saw.

Referring now to the drawings, portions of a rip saw apparatus are illustrated in cross section in FIG. 1. The apparatus illustrated includes a frame 10 suitably supported on the ground by pedestal structure 12. The feed or upstream side of the machine is to the right in FIG. 1. Material being supplied to the machine for cutting is conveyed to the machine in the direction of the arrow 14 shown to be deposited on feedplate 16. Material leaves the off-bearing side of the machine, which is shown to the left in the drawing, traveling onto a suitable conveyor system (not shown) to travel to other locations for further handling.

The saw apparatus illustrated has a slat bed dip chain conveyor 20 which conveys material through the machine during the cutting. Such includes continuous chains, such as the one shown at 24, extending on opposite sides of the machine. Extending between the chains and interconnecting the chains and supporting the work are multiple slats 28. The upper runs of chains 24 and the slats that they carry are suitably supported in the machine to extend in a horizontal plane.

Training opposite extremities of chains 24 are sprockets, as exemplified by sprockets 30, 32. The sprockets are keyed to shafts 36, 38 journaled in a suitable manner in the machine. Suitable power is transmitted to at least one of these shafts to produce movement of the upper runs of chains 24 and the slat bed dip chain under power from right to left in FIG. 1.

A power driven saw arbor 44 is mounted in a horizontal position extending across or transversely of the path of travel of work-pieces, i.e., boards, through the saw apparatus. The arbor is above the path of travel for the work-pieces. Ends of the arbor are suitably journaled on the frame of the apparatus, and the arbor is rotated under power, to rotate in a counterclockwise direction as the shaft is illustrated in FIG. 1. The arbor is employed in the mounting of a plurality of equal-sized, circular saws, as exemplified by the saws 48, 50 shown in the drawing. The saws are axially shiftable along the arbor to change the position of the saws and their spacing from other saws on the arbor. While the saws are relatively axially moveable on the arbor, they are keyed to the arbor for rotation with the arbor through key structuring including the key ways indicated at 52. Details of the particular mounting of the saws on the arbor, and how such are keyed to the arbor for rotation, are not herein disclosed, as this construction may follow conventional designs. Exemplifying constructions that might be employed in the mounting of the saws are the constructions shown in U.S. Pat. No. 3,202,189, and U.S. Pat. No. 4,414,875, and the disclosures of these patents are incorporated herein by reference.

Indicated at 60 is a shifter mechanism which is provided in the saw apparatus for the purpose of shifting respective saws along the axis of saw arbor 44, on demand, and to the precise extent desired for the respective saws. This shifter mechanism includes rotated shafts 64, 66 suitably mounted on the frame of the machine and supporting shifters which are slidably mounted on the shafts. A shifter is connected to each saw, so that on movement of a shifter, corresponding movement occurs in a saw. Again, details of the shifter mechanism are not set forth herein as these details are not necessary for an understanding of the invention, and shifter mechanisms performing the function described are well-known. Reference may be add to above identified U.S. patents for additional details of shifter mechanisms that have been proposed in the past.

The clamp or hold-down system contemplated by the invention as disclosed herein comprises a pair of clamp structures or clamp assemblies disposed on the upstream and downstream sides, respectively, of the cutting station in the saw apparatus. In FIG. 1, the cutting station is indicated at 70, and is located directly below axis 72 of the saw arbor. The clamp or hold-down assemblies have been given the reference numbers 76 and 80, respectively.

Considering initially assembly 76, 86 indicates a carrier formed of end plates 88, 89, a back 90, and center lug portion 92. The carrier is positioned with its end plates adjacent opposite sides of the path of travel of material through the saw apparatus and in a position generally paralleling the axis of the saw arbor. An elongate pressure shoe is shown at 96. The shoe is fastened with fasteners 94 to a forward portion of the carrier. The shoe has a bottom slide face 96a which slidably presses downwardly on work-pieces being cut.

Suitably rotatably mounted on and located between the end plates of the carrier is a pressure or hold-down roll 100. The bottom of the roll and face 96a are essentially on a common plane. The roll complements the pressure shoe in providing stabilizing downward pressure on the upper faces of work-pieces as the same are cut. Further, the roll helps to deflect and guide the end of an incoming piece under the hold-down assembly should the piece become misaligned, etc.

The clamp assembly is guided for movement on an inclined path. Specifically, secured to the frame of the saw apparatus adjacent opposite sides of the path of material are guides or guide plates 110. Securement to the frame is done in any suitable manner, as by using lugs 110a. The guide plates have inclined guide slots 112, 114 which define an inclined guide path. Supporting within these guide slots, and mounted on the end plates of the carrier of the claim assembly, are cams or roll bearings 116, 118. The cams constitute elements borne by the carrier moveable in a guide path defined by the guide plate.

Figure 3:
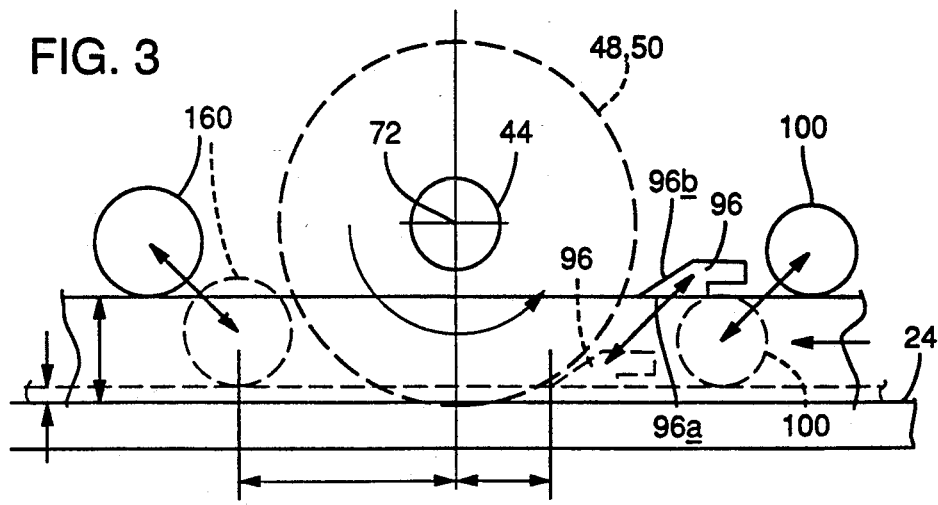
FIG. 3 is a diagrammatic drawing.

The path of movement defined is one inclined toward the path of travel of a work-piece past the saws, progressing in the direction of travel of a work-piece. In the particular embodiment illustrated, and as probably best illustrated in FIG. 3 by the movement of roll 100 and shoe 96, this path of movement is inclined at approximately 45 degrees with respect to the path of movement of the work-piece. It will also be noted that shoe 96 has a beveled top defined by a sloping face 96b, which converges on slide face 96a at an acute angle.

The construction described enables the shoe to be positioned outside of the path of the teeth of the saws but closely adjacent to the path of these teeth, with the shoe in all of its positions. When raised as when handling a thicker piece, as shown by the solid outline in FIG. 3, or lowered, as when handling a thinner piece, as shown by the dashed outline in FIG. 3, hold-down pressure is applied to the top face of the work-piece immediately adjacent but slightly on the infeed side of where the cutting occurs. Movement of the forward edge of the shoe is in a path which parallels a tangent to the peripheries of the saws at a region angularly spaced approximately 45 degrees from the bottom extremities of the saws.

Referring to FIG. 1, mounted with its rod end 120 journaled to lug 92, is a ram or pneumatic cylinder 124. A trunnion mounting 126 supports the cylinder of this ram on the frame of the machine, and accommodates slight rotating or pivoting of the ram cylinder as is necessary when it extends or contracts by reason of its connection with lug 92. Hand crank 130 is adjusted to adjust the machine for the handling of differing board thicknesses, with adjustment of the hand crank serving to adjust the extent to which the ram is extendable with the admission of air under pressure to the cam.

Secured to carrier 86 with fasteners 132 is a wiper 134 which wipes the top surface of a work-piece or board immediately prior to this surface moving under the pressure roll and shoe.

In the embodiment of the invention shown, a hood structure 140 is provided which encloses the region taken up by the saws and shifter mechanism 60. A vacuum may be applied to the interior of this region through vacuum duct 142. This feature of the invention is important from the standpoint of confinement of air carrying entrained particles. Partially closing off the evacuated region is a flexible curtain member 144.

Describing hold-down or clamp assembly 80, this also includes a carrier 150, which is similar to carrier 86 earlier described, and includes end plates, such as end plate 152, and a back, such as back 154.

While a shoe may be provided in the downstream clamp assembly, in the embodiment shown, hold-down roll 160 forms a portion of the clamp assembly located closest to the cutting station in the saw mechanism. The roll is suitably journaled on the carrier in a position between the end plates that form the end of the carrier. By including the hold-down roll, when the forward end of a piece newly being cut advances through the cutting station, such moves easily under the roll, thence to be clamped and held down firmly on the slat bed dip chain conveyor supporting the underside of the lumber.

The carrier is guided for movement along an inclined path which, in the case of the downstream claim assembly, is a path which inclines towards the path of travel of the work progressing in a direction extending opposite to the direction of travel of a work-piece through the machine. This guided movement is provided by guide plates, such as the one shown at 164 securely secured to the frame of the machine and having guide slots 166 therein. Received within the guide slots are cams or roll bearings 168 which are mounted on end plates 152 of the carrier.

The hold-down assembly 80 is biased downwardly with a ram or pneumatic cylinder 170 which, like ram 124, has its rod end connected to the carrier in the clamp assembly and its cylinder end mounted through a trunnion 172 on the frame of the machine.

Partially shown at 174 is a curtain member which, like curtain 144, serves to confine dust and other particulate material to the region within hood structure 140.

If desired, additional hold-down roll structures may be provided, such as those shown at 180 and 182.

Operation of the saw mechanism should be readily apparent from the above description. With lumber advanced into the saw mechanism, hold-down or clamp assembly 76 with its beveled shoe 96 provides support for a board piece immediately prior to such being cut by the rotating saws. With thicker lumber, the carrier and the pressure show that is supported thereon move upwardly and to the right, but because of the guide path provided, and the configuration of the forward portion of the pressure shoe, contact is maintained with a board until immediately prior to being cut. This relationship also exists with thinner pieces. Clamping or holding down of the lumber is also maintained as the trailing end of the lumber piece travels through the machine.

The slide mountings for the hold-down or clamp assemblies are located adjacent opposite sides of the machine and out of the way of the lumber being processed. The construction in no way impairs free movement of the saws, which, by reason of the nature of the machine, are moved axially along the power-driven arbor.

While an embodiment of the invention has been described, it should be apparent that variations and modifications are possible.

It is claimed and desired to secure by Letters Patent:

1. In a rip saw which includes a frame, a power-driven saw arbor mounted on the frame, and plural saws mounted on said arbor and keyed to the arbor for rotation with the arbor:
   a support for a work-piece being cut disposed on upstream and downstream sides of said arbor for supporting one side of the work-piece with the work-piece being moveable in a travel path in a direction extending from the upstream toward the downstream side of the arbor,
   an upstream clamp structure and a downstream clamp structure for clamping against an opposite side of a work-piece being cut in regions disposed on the upstream and on the downstream side of the arbor, respectively,
   the upstream clamp structure including an elongated upstream slidable pressure shoe structure on the upstream side of the arbor extending generally parallel to the axis of the arbor and across the peripheries of the saws for applying pressure to the work-piece, and
   an inclined-path-producing mounting for the upstream pressure shoe structure supporting the upstream pressure shoe structure for movement in an inclined guide path from an upper first position to a second position lower than and downstream from said first position.

2. The rip saw of claim 1 wherein the mounting for the upstream pressure shoe structure comprises a guide for each end of the pressure shoe structure defining an inclined guide path, and a guided element borne by the upstream pressure shoe structure and supported by the guide and moveable in said guide path.

3. The rip saw of claim 1, wherein the mounting for the upstream pressure shoe structure comprises a guided element borne by an end of the upstream pressure shoe structure, a guide having a pair of guide slots mounted on the frame of the rip saw, and the guided element has a pair of cams received within and guided by respective slots of the guide.

4. The rip saw of claim 1, wherein the upstream clamp structure further includes an elongated hold-down roll generally paralleling the upstream pressure shoe structure.

5. In a rip saw which includes a frame, a power-driven saw arbor mounted on the frame, and plural saws mounted on the arbor, and keyed to the arbor for rotation with the arbor:
   a support for work being cut by the rip saw, disposed on upstream and downstream sides of said arbor, for supporting one side of the work-piece being cut with the work-piece moveable in a direction extending from the upstream toward the downstream side of the arbor and along a travel path,
   an upstream clamp structure and a downstream clamp structure, each for clamping against an opposite side of a work-piece being cut, in regions disposed upstream and downstream, respectively, of the saw arbor,
   each clamp structure extending generally parallel to the axis of the arbor and across the peripheries of the saw, and
   a mounting for each clamp structure whereby the structure is moveable along an inclined path, the mounting for the upstream clamp structure accommodating movement between an upper first position to a second position lower than and downstream from said first position, and the mounting for the downstream clamp structure accommodating movement from an upper first position to a second position lower than and upstream from said first position.

6. The rip saw of claim 5, wherein the mounting for a clamp structure comprises a guide plate secured to the frame on one side of the path of travel of a work-piece having an inclined guide path defined thereon and a carrier for the clamp structure which includes a guided element moveable within said guide path.

7. The rip saw of claim 5, which further comprises an air-operated biasing means connected to a clamp structure, urging the clamp structure in a direction extending toward a work-piece passing thereunder.

8. The saw of claim 7, wherein a clamp structure includes a shoe structure which in operation slides against the side of a work-piece, as the work-piece travels thereunder, and a hold-down roll disposed to one side of the shoe, and the mounting for a clamp structure includes a carrier plate having an end of the shoe mounted thereon and having an end of the hold-down roll relatively rotatively mounted thereon.

* * * * *